US010424825B2

(12) United States Patent
Talty et al.

(10) Patent No.: US 10,424,825 B2
(45) Date of Patent: Sep. 24, 2019

(54) TRAVELING WAVE LTE ANTENNA FOR DUAL BAND AND BEAM CONTROL

(71) Applicant: GM GLOBAL TECHNOLOGY OPERATIONS LLC, Detroit, MI (US)

(72) Inventors: Timothy J. Talty, Beverly Hills, MI (US); Keerti S. Kona, Woodland Hills, CA (US); Amit M. Patel, Santa Monica, CA (US); Hyok Jae Song, Oak Park, CA (US); James H. Schaffner, Chatsworth, CA (US); Duane S. Carper, Davison, MI (US); Eray Yasan, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 15/583,369

(22) Filed: May 1, 2017

(65) Prior Publication Data

US 2017/0324144 A1 Nov. 9, 2017

Related U.S. Application Data

(60) Provisional application No. 62/332,692, filed on May 6, 2016.

(51) Int. Cl.
*H01Q 1/12* (2006.01)
*H01Q 1/32* (2006.01)
(Continued)

(52) U.S. Cl.
CPC .......... *H01Q 1/1271* (2013.01); *H01Q 1/325* (2013.01); *H01Q 13/20* (2013.01); *H01Q 13/28* (2013.01); *H01Q 21/00* (2013.01)

(58) Field of Classification Search
CPC .......... H01Q 1/1271; H01Q 1/38; H01Q 1/48; H01Q 13/203; H01Q 13/206; H01Q 13/20;
(Continued)

(56) References Cited

U.S. PATENT DOCUMENTS

2003/0034926 A1* 2/2003 Veerasamy .......... H01Q 1/1271 343/713
2005/0012667 A1* 1/2005 Noujeim .................. H01Q 1/38 343/700 MS
(Continued)

OTHER PUBLICATIONS

Grbic et al. "Leaky CPW-Based Slot Antenna Arrays for Millimeter-Wave Applications", IEEE Transactions on Antennas and Propagation, vol. 50, No. 11, Nov. 2002 (Year: 2002).*
(Continued)

*Primary Examiner* — Dieu Hien T Duong
*Assistant Examiner* — Bamidele A Jegede
(74) *Attorney, Agent, or Firm* — Cantor Colburn LLP

(57) ABSTRACT

A thin film, flexible, leaky-wave CPW antenna that can mounted to a dielectric substrate on a vehicle, such as vehicle glass, where the antenna has application for a MIMO LTE cellular system, and where the conductive portion of the antenna can employ transparent conductors. The antenna includes a ground plane having opposing first and second ground lines defining a gap therebetween and an antenna radiating element extending between the ground lines in the gap. The antenna radiating element includes a plurality of leaky-wave tuning stubs crossing the antenna radiating element at predetermined intervals that operates to change the radiation pattern of the antenna to be more parallel to the ground.

20 Claims, 2 Drawing Sheets

(51) Int. Cl.
*H01Q 13/28* (2006.01)
*H01Q 21/00* (2006.01)
*H01Q 13/20* (2006.01)

(58) Field of Classification Search
CPC ........ H01Q 21/00; H01Q 1/325; H01Q 13/28; H01P 5/028; H01P 5/085; H01R 12/7076; H01R 2201/02; H01R 2201/26
See application file for complete search history.

(56) References Cited

U.S. PATENT DOCUMENTS

2005/0052334 A1* 3/2005 Ogino .................. H01Q 1/1271
343/866
2007/0040746 A1* 2/2007 Song .................... H01Q 1/1271
343/700 MS
2007/0279303 A1* 12/2007 Schoebel ........... H01Q 21/0075
343/713
2009/0128431 A1* 5/2009 Martin .............. B32B 17/10036
343/713
2009/0174609 A1* 7/2009 Sanada ............... H01P 1/20381
343/700 MS
2011/0148727 A1* 6/2011 Chang .................... H01Q 13/20
343/777
2013/0024169 A1* 1/2013 Veerasamy ....... B32B 17/10036
703/2
2015/0022417 A1* 1/2015 Pan .......................... H01Q 1/48
343/843

OTHER PUBLICATIONS

Ilvonen et al. "Multiband Frequency Reconfigurable 4G Handset Antenna with MIMO Capability", Progress In Electromagnetics Research, vol. 148, 233-243, 2014 (Year: 2014).*
Singh et al. "Compact Active Antenna For Mobile Devices Supporting 4G LTE", 2014 Loughborough Antennas and Propagation Conference (LAPC) (Year: 2014).*
Panda, Jyoti Ranjan et al. "A Compact CPW-Fed Hexagonal 5 GHz/6 GHz Band-Notched Antenna with an U-Shaped Slot for Ultrawideband Communication Systems" Signal Processing and Communications (SPCOM), 2010 International Conference, Jul. 18-21, 2010, IEEE.
Grbic, Anthony et al. "Leaky CPW-Based Slot Antenna Arrays for Millimeter-Wave Applications" IEEE Transactions on Antennas and Propagation, vol. 50, No. 11, Nov. 2002, pp. 1494-1504.

* cited by examiner

TRAVELING WAVE LTE ANTENNA FOR DUAL BAND AND BEAM CONTROL

CROSS-REFERENCE TO RELATED APPLICATIONS

This application claims the benefit of the priority date of U.S. Provisional Patent Application Ser. No. 62/332,692, titled, Traveling Wave LTE Antenna for Dual Band and Beam Control, filed May 6, 2016.

BACKGROUND OF THE INVENTION

Field of the Invention

This invention relates generally to a thin film, flexible antenna configured on a dielectric substrate and, more particularly, to a thin film, flexible, leaky-wave co-planar waveguide (CPW) antenna that may include transparent conductors so as to allow the antenna to be adhered to a visible part of vehicle glass.

Discussion of the Related Art

Modern vehicles employ various and many types of antennas to receive and transmit signals for different communications systems, such as terrestrial radio (AM/FM), cellular telephone, satellite radio, dedicated short range communications (DSRC), GPS, etc. The antennas used for these systems are often mounted to a roof of the vehicle so as to provide maximum reception capability. Further, many of these antennas are often integrated into a common structure and housing mounted to the roof of the vehicle, such as a "shark-fin" roof mounted antenna module. As the number of antennas on a vehicle increase, the size of the structures required to house all of the antennas in an efficient manner and providing maximum reception capability also increases, which interferes with the design and styling of the vehicle. Because of this, automotive engineers and designers are looking for other suitable areas on the vehicle to place antennas that may not interfere with vehicle design and structure.

One of those areas is the vehicle glass, such as the vehicle windshield, which has benefits because glass typically makes a good dielectric substrate for an antenna. For example, it is known in the art to print AM and FM antennas on the glass of a vehicle where the printed antennas are fabricated within the glass as a single piece. However, these known systems are generally limited in that they can only be placed in a vehicle windshield or other glass surface in areas where viewing through the glass is not necessary.

Cellular systems are currently expanding into 4G long term evolution (LTE) that requires multiple antennas to provide multiple-input multiple-output (MIMO) operation, which provides greater data throughput and bandwidth than previous cellular communications technologies, such as 2G and 3G. LTE 4G cellular technology employs MIMO antennas at the transmitter and the receiver that provide an increase in the number of signal paths between the transmitter and the receiver, including multipath reflections off of various objects between the transmitter and the receiver, which allows for the greater data throughput. As long as the receiver can decouple the data being received on each path at the MIMO antennas where the signals are uncorrelated, then those paths can be used by the receiver to decipher data transmitted at the same frequency and at the same time. Thus, more data can be compressed into the same frequency providing higher bandwidth.

Automobile manufacturers are looking to provide 4G cellular technology in vehicles, which presents a number of design challenges especially if the MIMO antennas are incorporated as part of a common antenna structure mounted to the roof of the vehicle. For example, by housing the MIMO antennas, which include at least two antennas, in the traditional telematics antenna module mounted to the roof of the vehicle, the entire antenna volume of the module would need to increase because of the extra real estate required for the MIMO antennas, which require a low correlation of the received signals at the antennas. In other words, because the signals received by the MIMO antennas need to be significantly uncorrelated, the distance between the antennas needs to be some minimum distance depending on the frequency band being employed. This de-correlation between the antenna ports is often times difficult to achieve in various designs if the antenna elements are located at the same general location because the signals received at the port would be very similar. This problem can be overcome by moving the antennas farther apart, such as placing the antennas on the vehicle glass.

For those antennas that are adhered to the vehicle windshield or rear window, the curvature of the window causes the radiation pattern of the antenna to be directed more upward rather than parallel to the ground. Because the radiation pattern is directed upward in this manner, the transmission and reception direction of the antenna is often not specifically directed towards the desired receiver or transmitter, and thus signal loss can occur.

SUMMARY OF THE INVENTION

The present invention discloses and describes a thin film, flexible, leaky-wave CPW antenna that can be mounted to a dielectric substrate on a vehicle, such as vehicle glass, where the antenna has application for a MIMO LTE cellular system, and where the conductive portion of the antenna can employ transparent conductors. The antenna includes a ground plane having opposing first and second ground lines defining a gap therebetween and an antenna radiating element extending between the ground lines in the gap. The antenna radiating element includes a plurality of leaky-wave tuning stubs crossing the antenna radiating element at predetermined intervals that operates to change the radiation pattern of the antenna to be more parallel to the ground.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a thin film, flexible leaky-wave CPW antenna structure suitable to be adhered to a curved dielectric structure is merely exemplary in nature, and is in no way intended to limit the invention or its applications or uses. For example, the discussion herein talks about the antenna being applicable to be adhered to automotive glass. However, as will be appreciated by those skilled in the art, the antenna will have application for other dielectric structures other then automotive structures and other then transparent or translucent surfaces.

As discussed above, it is often desirable to provide antennas on vehicles that are transparent and can be integrated in a conformal manner to the curved windshield or other vehicle glass. The present invention proposes an antenna structure that has particular application for MIMO LTE cellular systems operating in, for example, the 0.46-3.8 GHz frequency band when mounted or integrated on the vehicle glass. The antenna structure can be shaped and patterned into a transparent conductor and a co-planar structure where both the antenna and ground conductors are printed on the same layer. The antenna structure can be designed to operate on automotive glass of various physical thicknesses and dielectric properties, where the antenna structure operates as intended when installed on the glass or other dielectric since in the design process the glass or other dielectric is considered in the antenna geometry pattern development.

Figure 1:
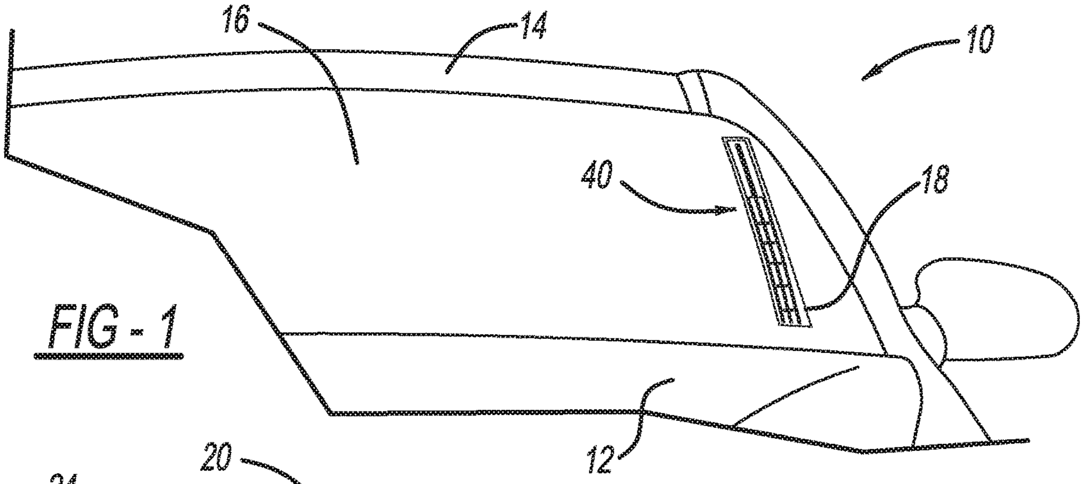
FIG. 1 is a cut-away front view of a vehicle showing a vehicle windshield having a thin film antenna structure formed thereon.

FIG. 1 is a cut-away front view of a vehicle 10 including a vehicle body 12, roof 14 and windshield 16. A travelling-wave type leaky-wave CPW antenna structure 40 formed on a thin film substrate 18 is adhered to the windshield 16 as will be discussed in detail below, where the antenna structure 40 may be one of two antennas on the vehicle glass for MIMO LTE applications.

Figure 2:
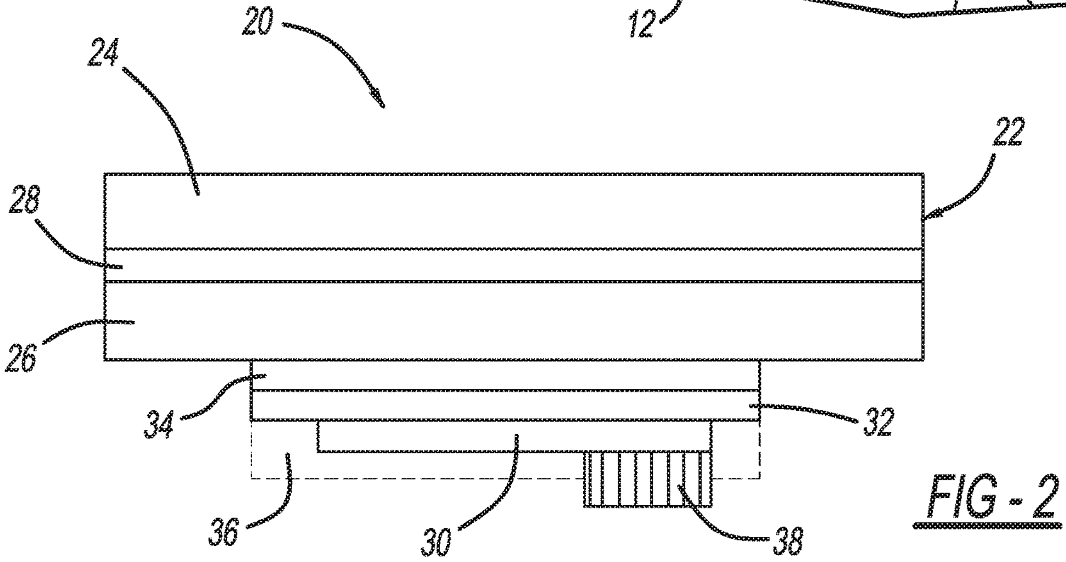
FIG. 2 is a profile view of a vehicle window including a thin film, flexible antenna formed thereon.

FIG. 2 is a profile view of an antenna structure 20 including a windshield 22 having an outer glass layer 24, an inner glass layer 26 and a polyvinyl butyral (PVB) layer 28 therebetween. The structure 20 includes an antenna 30, such as the antenna structure 40, formed on a thin, flexible film substrate 32, such as polyethylene terephthalate (PET), biaxially-oriented polyethylene terephthalate (BoPET), flexible glass substrates, mylar, Kapton, etc., and adhered to a surface of the layer 26 by an adhesive layer 34. The adhesive layer 34 can be any suitable adhesive or transfer tape that effectively allows the substrate 32 to be secured to the glass layer 26, and further, if the antenna 30 is located in a visible area of the glass layer 26, the adhesive or transfer tape can be transparent or near transparent so as to have a minimal impact on the appearance and light transmission therethrough. The antenna 30 can be protected by a low RF loss passivation layer 36, such as parylene. An antenna connector 38 is shown connected to the antenna 30 and can be any suitable RF or microwave connector such as a direct pig-tail or coaxial cable connection. Although the antenna 30 is shown being coupled to an inside surface of the inner glass layer 26, the conductor 30 can be adhered to the outer surface of the outer glass layer 24 or the surface of the layers 24 or 26 adjacent to the PVB layer 28 or the surfaces of the PVB layer 28.

The antenna 30 can be formed by any suitable low loss conductor, such as copper, gold, silver, silver ceramic, metal grid/mesh, etc. If the antenna 30 is at a location on the vehicle glass that requires the driver or other vehicle occupant to see through the glass, then the antenna conductor can be any suitable transparent conductor, such as indium tin oxide (ITO), silver nano-wire, zinc oxide (ZnO), etc. Performance of the antenna 30 when it is made of a transparent conductor could be enhanced by adding a conductive frame along the edges of the antenna 30 as is known in the art.

The thickness of automotive glass may vary approximately over 2.8 mm-5 mm and have a relative dielectric constant $\in_r$ in the range of 4.5-7.0. The antenna 30 includes a single layer conductor and a co-planar waveguide (CPW) feed structure to excite the antenna radiator. The CPW feed structure can be configured for mounting the connector 38 in a manner appropriate for the CPW feed line or for a pigtail or a coaxial cable. When the connector 38 or the pigtail connection to the CPW line is completed, the antenna 30 can be protected with the passivation layer 36. In one embodiment, when the antenna 30 is installed on the glass, a backing layer of the transfer tape can be removed. By providing the antenna conductor on the inside surface of the vehicle windshield 22, degradation of the antenna 30 can be reduced from environmental and weather conditions.

Figure 3:
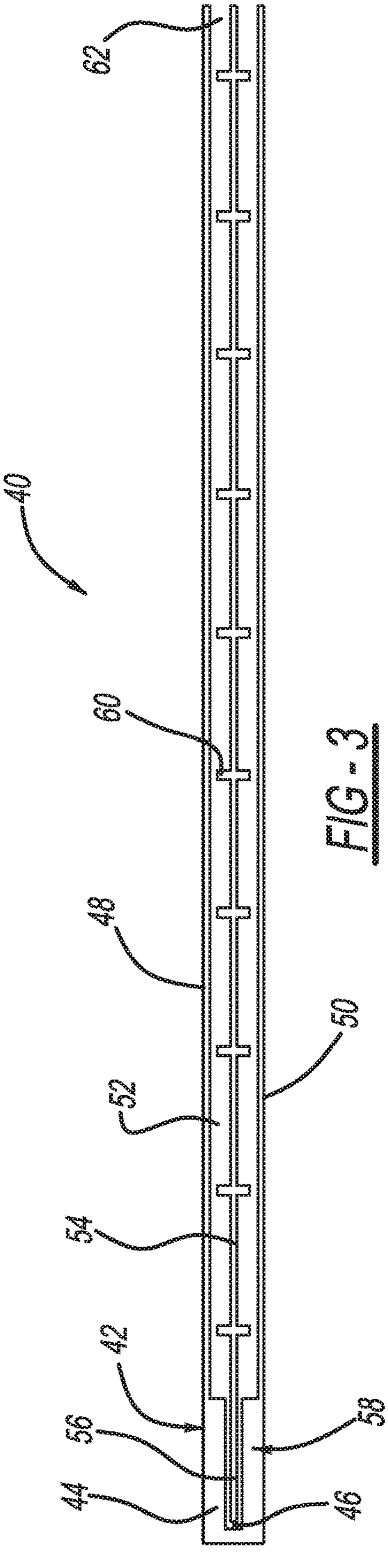
FIG. 3 is top view of the antenna structure shown in FIG. 1.

FIG. 3 is a top view of the CPW antenna structure 40 shown in FIG. 1, where the antenna structure 40 includes an elongated ground plane 42 having a base section 44 including a slot 46 formed therein and two opposing ground lines 48 and 50 defining a gap 52 therebetween, where the gap 52 is open at an end 62 opposite to the base section 44. An antenna radiating element 54 extends through and along the gap 52 to the end 62 and includes a feed line portion 56 positioned within the slot 46 that is part of a CPW feed structure 58, as shown. A series of crossing bus bars 60, here ten, are provided along the radiating element 54 at predetermined intervals within the gap 52, as shown. The signal received by the radiating element 54 creates a signal wave that propagates down the radiating element 54 and generates circular currents in the crossing bus bars 60 that cause energy to be radiated away, thus providing the leaky-wave effect, which causes a certain amount of radiation to be directed from the antenna structure 40. As the wave propagates down the radiating element 54 and encounters the crossing bus bars 60 the specific phase and amplitude of the wave at the particular bus bar 60 alters the directivity of the radiation pattern. In one embodiment, the distance between adjacent the bus bars 60 is much less than the free space wavelength of the center of the frequency band of interest. By optimizing the length of the crossing bus bars 60 and the spacing between the crossing bus bars 60 for the particular frequency band of interest, the directivity of the antenna structure 40 can be changed so that even though the antenna structure 40 is mounted to curved vehicle glass, such as the windshield 16, the antenna radiation pattern can be selectively optimized to be parallel to the ground, thus allowing better reception for receiving LTE signals from a cellular tower or otherwise.

Figure 4:
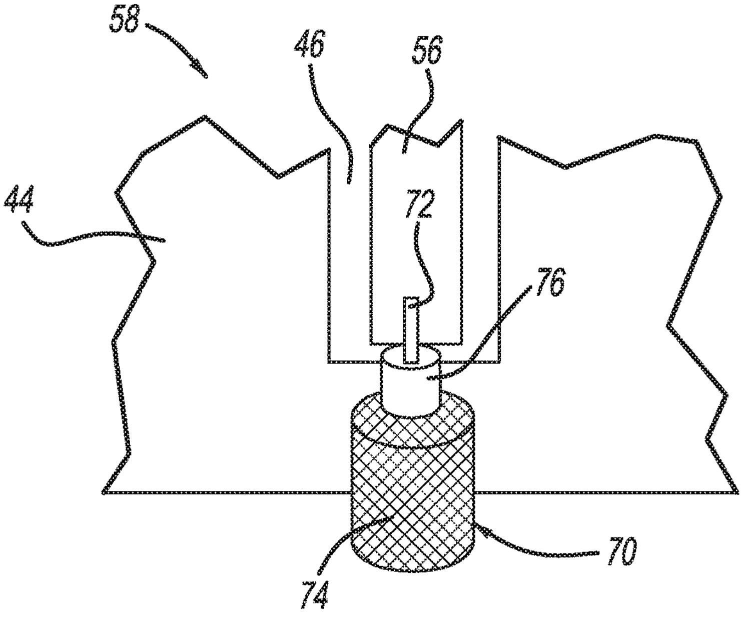
FIG. 4 is a top view of an antenna feed structure including a coaxial cable feed line for the antenna structure shown in FIG. 3.

Any suitable feed structure can be employed for feeding the antenna element 54 that provides proper impedance matching. FIG. 4 is top, cut-away view of the CPW antenna feed structure 58 showing one suitable example. In this embodiment, a coaxial cable 70 provides the incoming signal line for the feed structure 58 and includes an inner conductor 72 electrically coupled to the feed line portion 56 and an outer ground conductor 74 electrically coupled to the base section 44, where the conductors 72 and 74 are separated by an insulator 76.

In this embodiment, the antenna structure 40 is configured to be operable in the 700-1200 MHz lower LTE frequency band. As discussed, another antenna structure that is uncorrelated to the antenna structure 40 would need to be provided, and which is operable in the 1800-2400 MHz higher LTE frequency band.

Figure 5:
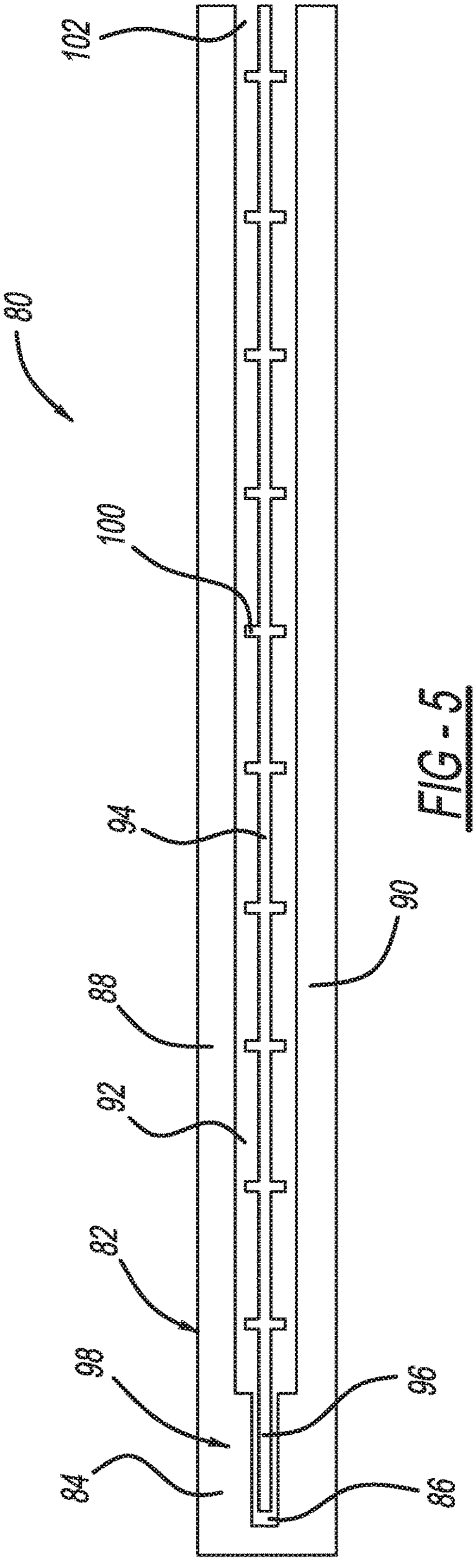
FIG. 5 is a top view of an antenna structure similar to the antenna structure shown in FIG. 3 but being configured for a different frequency band.

FIG. 5 is a top view of a travelling-wave type leaky-wave CPW antenna structure 80 that is configured to operate in the 1800-2400 MHz higher LTE frequency band and could be adhered to the vehicle windshield 16 to operate in conjunction with the antenna structure 40. The antenna structure 80 includes an elongated ground plane 82 having a base section 84 including a slot 86 formed therein and two opposing ground lines 88 and 90 defining a gap 92 therebetween, where the gap 92 is open at an end 102. An antenna radiating element 94 extends through and along the gap 92 to the end 102 and includes a feed line portion 96 positioned within the slot 86 that is part of a CPW feed structure 98, as shown. A series of crossing bus bars 100, here ten, are provided along the radiating element 94 at predetermined intervals within the gap 92, as shown.

In another embodiment, the antenna structures 40 and 80 can be combined into a single antenna array that operates over the entire LTE frequency band, where a filter/diplexer (not shown) can be employed to selectively provide the specific frequency band signals at a particular point in time.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An antenna structure comprising: a dielectric structure;

a thin film substrate adhered to the dielectric structure by an adhesive layer; and a leaky-wave co-planar waveguide (CPW) antenna formed to the substrate opposite to the adhesive layer, said antenna including a ground plane having opposing first and second ground lines defining a gap therebetween and an antenna radiating element extending between the ground lines in the gap, said antenna radiating element including a plurality of leaky-wave bus bars crossing the antenna radiating element at predetermined intervals and operating to cause radiation to be directed therefrom to change a radiation pattern of the antenna, wherein the predetermined intervals are less than a free space wavelength of a center of a predetermined frequency band, wherein the ground plane includes a conductive base portion from which the first and second ground lines extend and including a slot in communication with the gap, said antenna radiating element including a feed line portion positioned within the slot.

2. The antenna structure according to claim 1 further comprising a CPW feed structure that includes the base portion and the feed line portion.

3. The antenna structure according to claim 2 further comprising a coaxial connector connected to the CPW feed structure.

4. The antenna structure according to claim 1 wherein the dielectric structure is a vehicle window on a vehicle, and wherein the radiation pattern of the antenna is changed to be horizontal to the ground.

5. The antenna structure according to claim 4 wherein the vehicle window is a vehicle windshield.

6. The antenna structure according to claim 1 wherein the antenna includes transparent conductors.

7. The antenna structure according to claim 1 wherein the thin film substrate is selected from the group consisting of mylar, Kapton, PET and flexible glass substrates.

8. The antenna structure according to claim 1 wherein the antenna structure provides signals for a multiple-input multiple output (MIMO) long term evolution (LTE) cellular system.

9. The antenna structure according to claim 8 wherein the antenna operates in a frequency band in the range of 0.7-1.2 GHz.

10. The antenna structure according to claim 8 wherein the antenna operates in a frequency band in the range of 1.8-2.4 GHz.

11. The antenna structure according to claim 1 the dielectric structure having an outer layer and an inner layer with a polyvinyl butyral (PVB) layer between the inner layer and the outer layer, the thin film substrate adhered to the inner layer.

12. The antenna structure according to claim 11 wherein the thin film substrate is adhered to an interior surface of the inner layer of the dielectric structure.

13. An antenna structure comprising: a vehicle window;

a thin film substrate adhered to the vehicle window by an adhesive layer; and a leaky-wave co-planar waveguide (CPW) antenna formed to the vehicle window opposite to the adhesive layer, said antenna including a ground plane having opposing first and second ground lines defining a gap therebetween and an antenna radiating element extending between the ground lines in the gap, said antenna radiating element including a plurality of leaky-wave bus bars crossing the antenna radiating element at predetermined intervals and operating to cause radiation to be directed therefrom to change a radiation pattern of the antenna to be horizontal to the ground, wherein the antenna structure provides signals for a multiple-input multiple output (MIMO) long term evolution (LTE) cellular system, wherein the predetermined intervals are less than a free space wavelength of a center of a predetermined frequency band, wherein the ground plane includes a conductive base portion from which the first and second ground lines extend and including a slot in communication with the gap, said antenna radiating element including a feed line portion positioned within the slot.

14. The antenna structure according to claim 13 further comprising a CPW feed structure that includes the base portion and the feed line portion.

15. The antenna structure according to claim 14 further comprising a coaxial connector connected to the CPW feed structure.

16. The antenna structure according to claim 13 wherein the vehicle window is a vehicle windshield.

17. The antenna structure according to claim 13 wherein the antenna includes transparent conductors.

18. An antenna structure operating in a frequency band in the range of 0.7-1.2 GHz or 1.8-2.4 GHz, said antenna structure comprising:

a dielectric structure;

a thin film substrate adhered to the dielectric structure by an adhesive layer;

a leaky-wave co-planar waveguide (CPW) antenna formed to the substrate opposite to the adhesive layer, said antenna including a ground plane having opposing first and second ground lines defining a gap therebetween and an antenna radiating element extending between the ground lines in the gap, said ground plane including a conductive base portion from which the first and second ground lines extend and including a slot in communication with the gap, said antenna radiating element including a feed line portion positioned within the slot and a plurality of leaky-wave bus bars crossing the antenna radiating element at predetermined intervals and operating to cause radiation to be directed therefrom to change a radiation pattern of the antenna; and a CPW feed structure that includes the base portion and the feed line portion wherein the predetermined intervals are less than a free space wavelength of a center of a predetermined frequency band.

19. The antenna structure according to claim 18 wherein the dielectric structure is a vehicle window on a vehicle, and wherein the radiation pattern of the antenna is changed to be horizontal to the ground.

20. The antenna structure according to claim 18 wherein the antenna structure provides signals for a multiple-input multiple output (MIMO) long term evolution (LTE) cellular system.

* * * * *